United States Patent [19]
Floryan et al.

[11] 3,951,917
[45] Apr. 20, 1976

[54] PROCESS FOR REMOVAL OF CATALYST FROM POLYPHENYLENE ETHERS
[75] Inventors: Daniel E. Floryan, Glenmont; James W. Watson, Albany, both of N.Y.
[73] Assignee: General Electric Company, Pittsfield, Mass.
[22] Filed: July 23, 1974
[21] Appl. No.: 490,938

[52] U.S. Cl. ............................................. 260/47 ET
[51] Int. Cl.² ........................................ C08G 65/44
[58] Field of Search ................................ 260/47 ET

[56] References Cited
UNITED STATES PATENTS
3,306,875 2/1967 Hay........................................ 260/47
3,838,102 9/1974 Bennett et al. ....................... 260/47

*Primary Examiner*—Howard E. Schain
*Attorney, Agent, or Firm*—William F. Mufatti; Edward A. Hedman; James V. Costigan

[57] ABSTRACT

A novel process is disclosed for the removal of the metallic catalyst from a polymerization mixture which is based on the use of a salt of ethylenediamine tetraacetic acid and an antisolvent without phase separation.

19 Claims, No Drawings

PROCESS FOR REMOVAL OF CATALYST FROM POLYPHENYLENE ETHERS

This invention provides a process for the removal of the metallic catalyst from a polymerization mixture by the use of a salt of ethylenediamine tetraacetic acid and an antisolvent without phase separation.

BACKGROUND OF THE INVENTION

The polyphenylene ethers and processes for their preparation are known in the art and described in numerous publications including Hay, U.S. Pat. Nos. 3,306,874 and 3,306,875, both of which are hereby incorporated by reference. Other patents which show the preparation of polyphenylene ethers include Price et al., U.S. Pat. No. 3,382,212 and Kobayashi et al., U.S. Pat. No. 3,455,880, which are also incorporated by reference.

The processes most generally used to produce the polyphenylene ethers involve the self-condensation of a monovalent phenol in the presence of an oxygen-containing gas and a catalyst comprising a metal-amine complex.

These processes are run in the presence of an organic solvent and the reaction is usually terminated by removal of the catalyst from the reaction mixture. This has been done by the use of aqueous solutions of acetic acid, sulfuric acid, sodium bisulfate, chelating agents such as glycine, nitrilotriacetic acid and its sodium salts or ethylenediamine tetraacetic acid and its sodium salts. The prior art procedure was based on an extraction of the organic reaction mixture with an aqueous solution, resolving the combined mixture into an aqueous and organic phase, separating the phases and, thereafter, recovering the polymer from the organic phase by various techniques. In any event, the prior art methods most often resulted in catalyst residues being carried over into the polymer due to failure to efficiently separate the viscous polymer solution from the aqueous salt solution. Furthermore, this failure to efficiently separate aqueous-organic phases limited the concentration of polymer in the organic phase by limiting the solution viscosity required to obtain good phase separation. The higher concentration solution of polymer results in a decrease solubility of polymer which makes phase separation difficult.

It has now been found that it is possible to reduce the level of catalyst residue in the polymer by eliminating the prior art steps of phase resolution and phase separation by adding an aqueous solution of a salt of ethylenediamine tetraacetic acid to a reaction mixture of a polyphenylene ether, and thereafter, combining that mixture with an antisolvent for the polyphenylene ether. This procedure reduces the amount of solvent required as polymer solutions with high solids content may be directly contacted with the salt of ethylenediamine tetraacetic acid without dilution.

Accordingly, it is an object of this invention to provide an improved process for the preparation of a polyphenylene ether resin with the aim of obtaining a polyphenylene ether resin with a reduced amount of metallic catalyst residue.

It is also an object of this invention to simplify the preparation of polyphenylene ethers by reducing the number of process steps required to obtain the product, and reducing the amount of solvent required.

It is also an object of this invention to provide a process which permits the removal of metal ion catalyst components from a reaction solution that contains high contents of solids.

DESCRIPTION OF THE INVENTION

This invention provides in a process for forming a polyphenylene ether by an oxidative coupling reaction in the presence of a chelatable metal-ion amine complex catalyst by passing an oxygen-containing gas through a reaction solution of a phenol and said catalyst, the improvement which comprises separating the metal-ion component of said catalyst by contacting the reaction solution with a salt of ethylenediaminetetraacetic acid and thereafter separating the polyphenylene ether by admixing the combined mixture of said reaction solution and said aqueous solution of a salt of ethylenediaminetetraacetic acid with an antisolvent for said polyphenylene ether.

It is preferred to add the ethylenediamine tetraacetic acid salt in the form of an aqueous solution although this is not essential. If a dry solid is employed, the free water formed in the polyphenylene ether synthesis will ordinarily be sufficient to dissolve the salt.

The preferred salts of ethylenediaminetetraacetic acid are the di-, tri- and tetra-sodium salts. Usually, these salts are employed as a 1-50% by weight aqueous solution, and more preferably a 10-40% by weight aqueous solution. The volume of such a solution to be used is selected so that a molar ratio of the salt to metal ion is in the range of 1:1 to 10:1 or more. The preferred range is 1:1 to 2:1.

The preferred polyphenylene ether is of the formula:

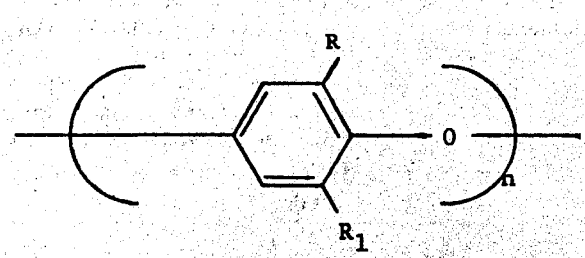

wherein the oxygen ether atom of one unit is connected to the benzene nucleus of the next adjoining unit, $n$ is an integer of at least 50; and R and $R_1$ are monovalent substituents selected from hydrogen, halogen, hydrocarbon radicals, halohydrocarbon radicals having at least two carbon atoms between the halogen atom and the phenyl nucleus, hydrocarbonoxy and halohydrocarbonoxy radicals having at least two carbon atoms between the halogen atom and the phenyl nucleus.

The preferred polyphenylene oxide is poly(2,6-dimethyl-1,4-phenylene) ether.

It is preferred to add the combined mixture of the polyphenylene ether reaction solution and the aqueous solution of the salt of ethylenediaminetetraacetic acid to an antisolvent for the polyphenylene ether resin which is a solvent for the EDTA copper complex. Suitable antisolvents include lower alcohols of from 1–6 carbon atoms such as methanol, ethanol and propanol. The preferred antisolvent is methanol.

An especially preferred method for carrying out the process of this invention is to employ a polyphenylene ether polymerization mixture having a high solids content. The term high solids is used herein to describe those polymerization mixtures having an excess of 20% by weight of solids. There is no known upper limit to the amount of solids but it appears that 50% by weight represents a practical upper limit that would be employed according to the present invention as above that amount, the solutions of polyphenylene ether resins become quite viscous.

The amount of antisolvent is not critical and from about 0.5 to 10 volumes of antisolvent per volume of reaction solution may be employed.

The precipitated polyphenylene ether resins may be recovered by conventional methods and dried to form a useful molding resin.

The preferred metal ion is copper although other metals may be employed.

DESCRIPTION OF THE PREFERRED EMBODIMENTS

EXAMPLE 1

A solution of 70 g of 2,6-xylenol in 83 ml of toluene was added over a fifteen-minute period to a 1 liter glass reactor containing 500 ml of toluene, 10.9 g of dibutylamine and 0.2 g $CuCl_2$, 0.39 g. NaBr in 4 ml of methanol. Oxygen was passed through the reaction mixture at the rate of 170° cc/min. for 120–125 minutes while the reactor was stirred at 1500 rpm. The reactor then contained 12% by weight of solids. The IV of the poly(2,6-dimethyl-1,4-phenylene) ether was determined to be 0.55 dl/gm in $CHCl_3$ at 30°C.

Thereafter, the reaction mixture was diluted with toluene to 9% by weight of solids and the following materials listed in Table 1 were added and the mixture was agitated in a Waring blender. After agitating the mixture for 2 minutes, and without phase separation, 1.5 vol of methanol was added per volume of mixture to precipitate the polymer.

TABLE 1

| Extraction Agent (% in $H_2O$) | Mol ratio of Extractant to Copper | PPM Cu in Polymer |
|---|---|---|
| 10% $(Na)_2$ EDTA.$2H_2O$ | 2:1 | <5 |
| 10% $(Na)_3$ EDTA | 2:1 | <5 |
| 10% $(Na)_4$ EDTA | 2:1 | <5 |

COMPARATIVE EXAMPLES

Using procedures analogous to Example 1, poly(2,6-dimethyl-1,4-phenylene) ether was made and various extractants were tested to determine the residue of copper in the polymer. The results are shown in Table 2.

TABLE 2

| Extraction Agent (% in $H_2O$) | Mol ratio of Extractant to Copper | PPM Cu residue |
|---|---|---|
| 50% Acetic Acid | 90:1 | 77 |
| 10% Sulfuric Acid | 34:1 | 113 |
| 10% Sodium Bisulfate | 68:1 | 314 |
| 10% Ammonium Sulfate | 30:1 | 224 |
| 10% Sodium Glycinate | 4:1 | 180 |
| 10% NTA $(Na)_3$ | 2:1 | 350 |
| 10% Glycine | 4:1 | 188 |
| 10% Ammonium Carbonate | 30:1 | 240 |

TABLE 2-continued

| Extraction Agent (% in $H_2O$) | Mol ratio of Extractant to Copper | PPM Cu residue |
|---|---|---|
| None | — | 382 |

EXAMPLE 2

A 61.1% solution of 53.1 lbs. of 2,6-xylenol was added to 38.6 gallons of toluene and a copper chloride, sodium bromide, dibutyl amine catalyst (250:1:2:37) was used to polymerize the 2,6-xylenol to an IV of 0.57 dl/gm (in $CHCl_3$ at 30°C.) Then 6000 g. of a 10% by weight solution of trisodium ethylenediaminetetraacetic acid was added to the reaction mixture and the combined mixture stirred for 30 minutes. Without phase separation, methanol is added to precipitate the poly(2,6-dimethyl-1,4-phenylene) ether. The residue of copper was determined to be 15 ppm.

EXAMPLE 3

A 53 wt. % solution of 59.37 lbs. of 2,6-xylenol was added to 32.88 gallons toluene and a copper chloride, sodium bromide, dibutyl-amine catalyst (250:1:2:45) was used to polymerize (100 minutes) the 2,6-xylenol to an IV of 0.55 dl/gm (in $CHCl_3$ at 30°C) and 20% by weight of solids. Thereafter, 631.92 g. of $Na_3$ EDTA (38% sol in $H_2O$) was added to the reaction mixture. Thereafter, without phase separation, 1.5 volumes of methanol per volume of mixture is added to precipitate the poly(2,6-dimethyl-1,4-phenylene)ether. The residue of copper was determined to be 20 ppm.

Other modifications and variations of the present invention are possible in the light of the above teachings. It is, therefore, to be understood that changes may be made in the particular embodiments of the invention described which are within the full intended scope of the invention as defined by the appended claims.

We claim:

1. In a process for forming a polyphenylene ether by an oxidative coupling reaction in the presence of a chelatable metal-ion amine complex catalyst comprising passing an oxygen-containing gas through a reaction solution of a phenol and said catalyst, the improvement which comprises separating the metal ion component of said catalyst by contacting the reaction solution with a salt of ethylenediaminetetraacetic acid and thereafter without phase separation, separating the polyphenylene ether by admixing the combined mixture of said reaction solution and said salt of ethylenediaminetetraacetic acid with an antisolvent for said polyphenylene ether.

2. A process as defined in claim 1 wherein said salt of ethylenediaminetetraacetic acid is added to the reaction solution as an aqueous solution.

3. A process as defined in claim 2 wherein tetrasodium ethylenediamine tetraacetic acid is employed.

4. A process as defined in claim 2 wherein trisodium ethylenediaminetetraacetic acid is employed.

5. A process as defined in claim 2 wherein disodium ethylenediaminetetraacetic acid is employed.

6. A process as defined in claim 2 wherein said polyphenylene ether is of the formula:

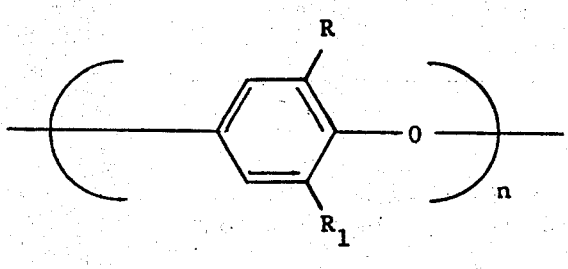

wherein the oxygen ether atom of one unit is connected to the benzene nucleus of the next adjoining unit; $n$ is an integer of at least 50; and R and $R_1$ are monovalent substituents selected from hydrogen, halogen, hydrocarbon radicals, halohydrocarbon radicals having at least two carbon atoms between the halogen atom and the phenyl nucleus, hydrocarbonoxy and halohydrocarbonoxy radicals having at least two carbon atoms between the halogen atom and the phenyl nucleus.

7. A process as defined in claim 6 wherein said polyphenylene ether is poly(2,6-dimethyl-1,4-phenylene) ether.

8. A process as defined in claim 7 wherein the molar ratio of the salt of ethylenediaminetetraacetic acid to metal ion is from 1:1 to 10:1.

9. A process as defined in claim 2 wherein the antisolvent is methanol.

10. In a process for forming a polyphenylene ether by an oxidative coupling reaction in the presence of a chelatable metal-ion amine complex catalyst comprising passing an oxygen containing gas through a reaction solution of a phenol and said catalyst, the improvement which comprises separating the copper ion component of said catalyst by contacting a reaction solution of said phenol and said catalyst that has a content of at least 20% by weight of solids, with a salt of ethylenediaminetetraacetic acid and thereafter without phase separation, separating the polyphenylene ether by admixing the combined mixture of said reaction solution and said salt of ethylenediaminetetraacetic acid with an antisolvent for said polyphenylene ether.

11. A process as defined in claim 10 wherein said salt of ethylenediaminetetraacetic acid is added to the reaction solution as an aqueous solution.

12. A process as defined in claim 11 wherein tetrasodium ethylenediamine tetraacetic acid is employed.

13. A process as defined in claim 11 wherein trisodium ethylenediaminetetraacetic acid is employed.

14. A process as defined in claim 11 wherein disodium ethylenediaminetetraacetic acid is employed.

15. A process as defined in claim 11 wherein said polyphenylene ether is of the formula:

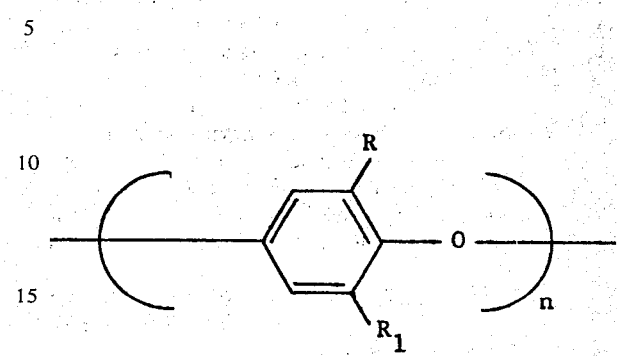

wherein the oxygen ether atom of one unit is connected to the benzene nucleus of the next adjoining unit; $n$ is an integer of at least 50; and R and $R_1$ are monovalent substituents selected from hydrogen, halogen, hydrocarbon radicals, halohydrocarbon radicals having at least two carbon atoms between the halogen atom and the phenyl nucleus, hydrocarbonoxy and halohydrocarbonoxy radicals having at least two carbon atoms between the halogen atom and the phenyl nucleus.

16. A process as defined in claim 15 wherein said polyphenylene ether is poly(2,6-dimethyl-1,4-phenylene) ether.

17. A process as defined in claim 16 wherein the molar ratio of the salt of ethylenediaminetetraacetic acid to metal ion is from 1:1 to 10:1.

18. A process as defined in claim 11 wherein the antisolvent is methanol.

19. In a process for forming a polyphenylene ether by an oxidative coupling reaction in the presence of a copper-amine complex catalyst comprising passing an oxygen containing gas through a reaction solution of a phenol and said catalyst, the improvement which consists essentially of separating the copper ion component of said catalyst by contacting a reaction soulution of said phenol and said catalyst that has a content of at least 20% by weight of solids with a salt of ethylenediaminetetraacetic acid to form a mixture and, thereafter without phase separation, separating the polyphenylene ether from said mixture by admixing the combined mixture of said reaction solution and said salt of ethylendiaminetetraacetic acid with an antisolvent for said polyphenylene ether that is a lower alkanol of 1–6 carbon atoms.

* * * * *